Dec. 27, 1960  W. E. THOURET  2,966,607
HIGH PRESSURE SHORT ARC LAMPS AND METHOD OF MAKING SAME
Filed May 26, 1959  3 Sheets-Sheet 1

INVENTOR.
WOLFGANG E. THOURET
BY
ATTORNEYS

Dec. 27, 1960 W. E. THOURET 2,966,607
HIGH PRESSURE SHORT ARC LAMPS AND METHOD OF MAKING SAME
Filed May 26, 1959 3 Sheets-Sheet 2
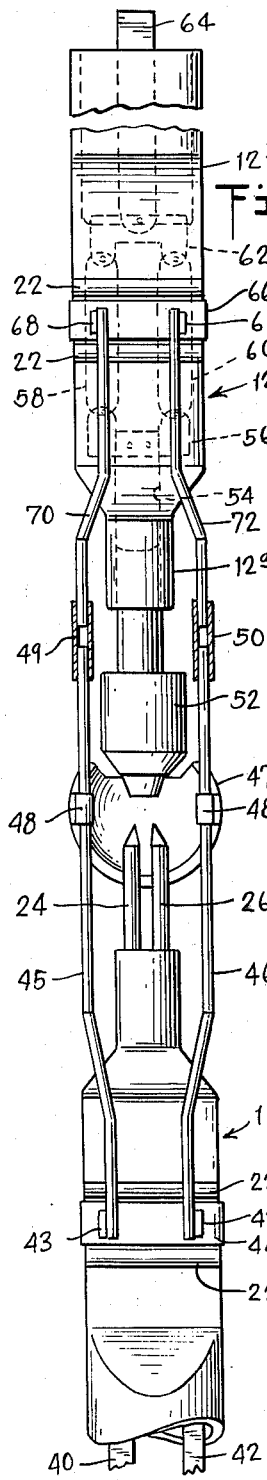
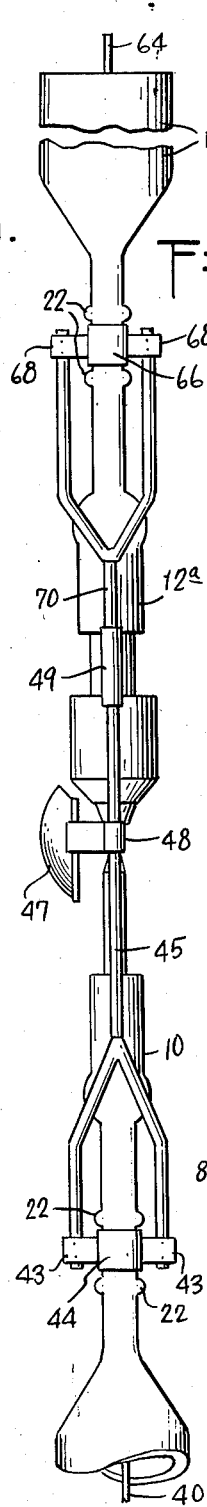
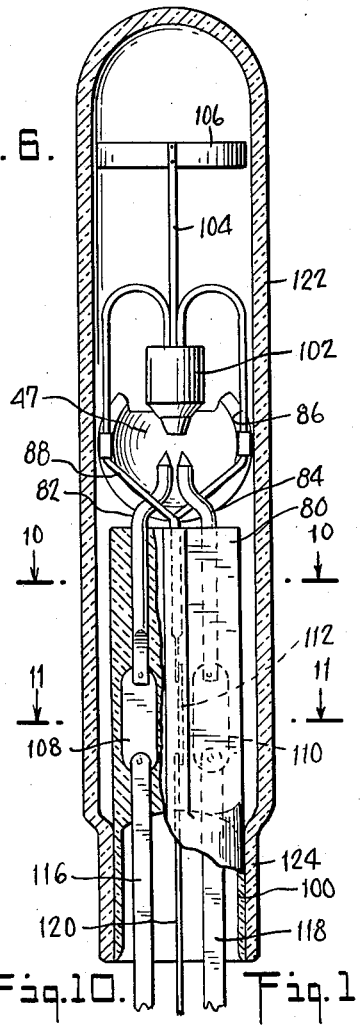
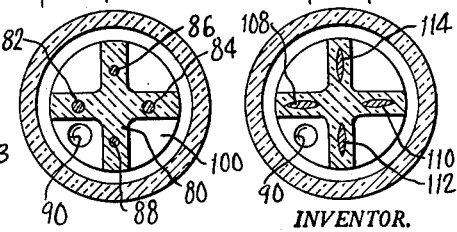
INVENTOR.
WOLFGANG E. THOURET
BY
ATTORNEYS

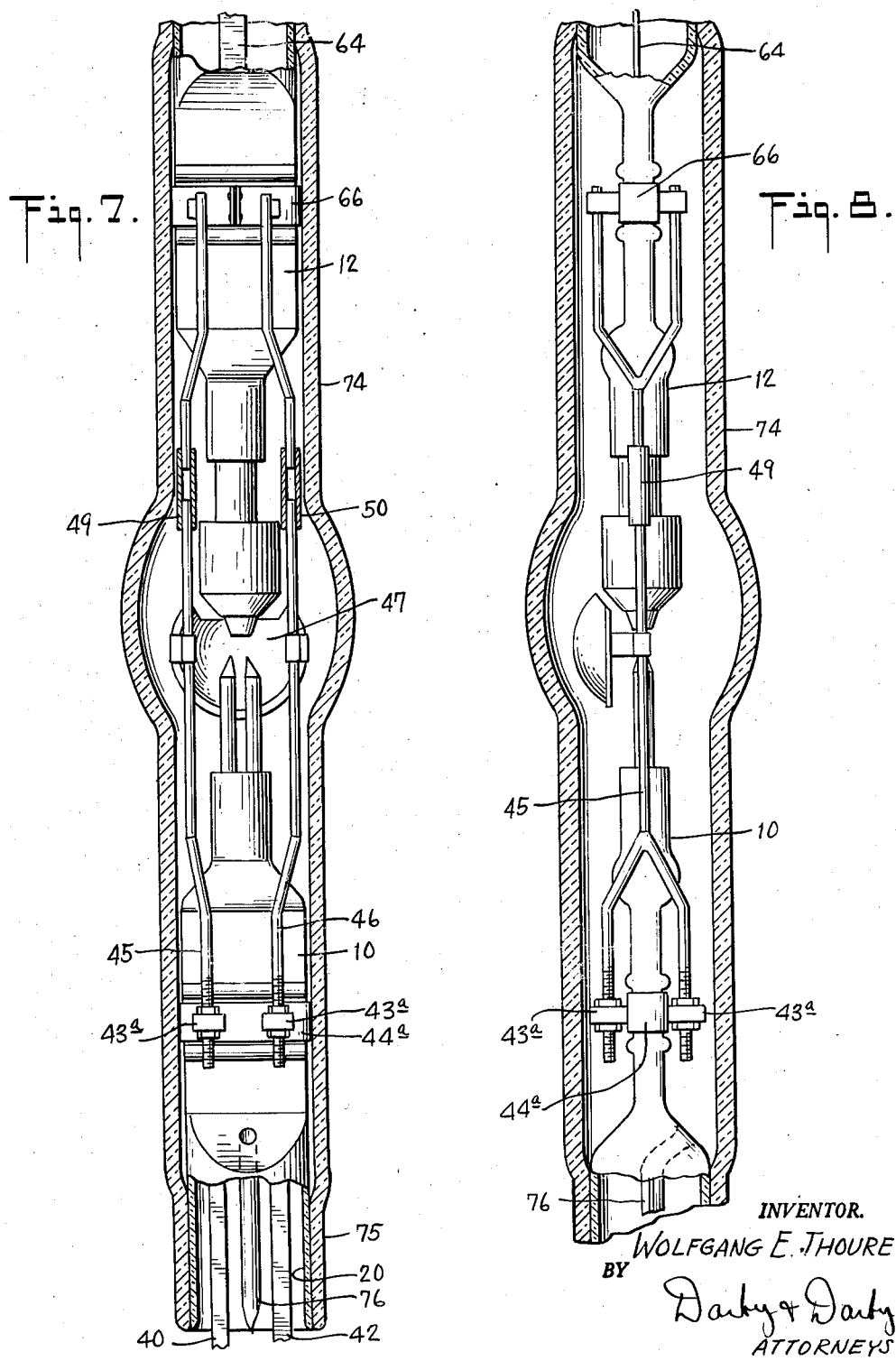

United States Patent Office 2,966,607
Patented Dec. 27, 1960

2,966,607

HIGH PRESSURE SHORT ARC LAMPS AND METHOD OF MAKING SAME

Wolfgang E. Thouret, East Orange, N.J., assignor to Duro-Test Corporation, North Bergen, N.J., a corporation of New York Filed May 26, 1959, Ser. No. 815,862

18 Claims. (Cl. 313—113)

This invention relates to improvements in the construction of high pressure short arc lamps containing a rare gas atmosphere such as xenon or krypton.

Another object of the invention is to provide novel methods of manufacturing such lamps, particularly directed to procedures which will permit automatic mechanization thereof.

Other and more detailed objects of the invention will be apparent from the following description of the several embodiments thereof illustrated in the accompanying drawings and described hereinafter in full detail.

In the accompanying drawings,

Figure 5 is an elevational view with some parts in section and some parts broken away of a subsidiary assembly employing the structure of Fig. 2 and a similar but slightly modified form of such structure in combination;

Figure 6 is an elevational view of the structure of Fig. 5 at right angles thereto;

Figure 7 is a longitudinal, central, cross-sectional view through a completely assembled lamp employing the sub-assembly of Figs. 5 and 6;

Figure 8 is a view similar to Fig. 7, taken at right angles thereto;

Figure 9 is a longitudinal, central, cross-sectional view through a modified form of arc lamp in accordance with this invention; and Figures 10 and 11 are cross-sectional views taken on the lines 10—10 and 11—11 of Fig. 9.

High pressure xenon or krypton short arc lamps, especially those of wattages higher than 500 watts, are at present most commonly manufactured manually by highly skilled labor. It follows that the cost therefore is very high and the accuracy and uniformity of the final product is subject to undesirable variations incident to hand construction. These variations do not meet the requirements of particular applications of lamps of this type such as in precision optical equipment, film projectors, and high powered searchlights.

It is the general purpose of this invention to provide novel methods of manufacture of such lamps which suits them to mechanized production as well as in the novel lamp constructions resulting from such adaptations. An important advantage derived from meeting these objectives is the resultant precision positioning and spacing of the electrodes. These results are obtained by efficient mass production procedures. These advantages are of particular value in the manufacture of lamps with more than one pair of electrodes and/or with an internal auxiliary mirror, the permanent positioning of which is of prime importance. As will appear hereinafter the accurate positioning of the mirror results in the proper focussing with respect to the electrode tips before the sealing-in process.

Further generalizations could be made, but the true nature of the invention will become quite clear from the following description of the construction of several embodiments thereof, accompanied by an explanation of the methods of producing and assembling the components into the finished lamps.

Figure 1:
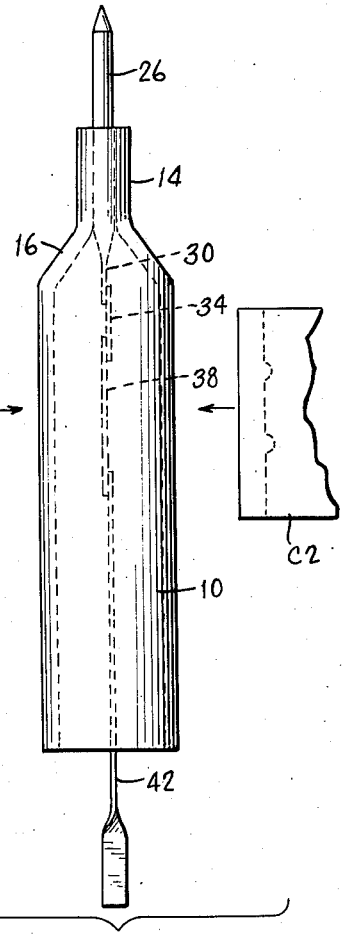
Figure 1 is an elevational view of one of the elements of such a lamp constructed in accordance with this invention and indicating preparation for one of the steps in the manufacture thereof.
Figure 4:
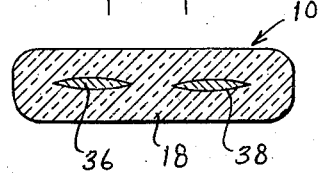
Figure 4 is a cross-sectional view taken on the line 4—4 of Fig. 2.

As illustrated in Fig. 1, one component of the lamp is illustrated comprising a quartz tube 10 which is molded at one end, as indicated at 14, into a cylindrical boss to provide a pair of parallel passages in which are loosely fitted a pair of electrodes 24 and 26. These electrodes are commonly tungsten rods which have been flattened on their inner ends, as indicated respectively at 28 and 30. Attached to these flattened ends by welding or any other suitable manner, are a pair of leads 32 and 34 which may be cut from molybdenum or tungsten strip. In turn and similarly connected thereto are a pair of molybdenum strips 36 and 38 which are elliptical in cross-section, as is clear from Fig. 4. In order to form a vacuum tight seal and at the same time withstand the tensile stresses during the press formation, the molybdenum pieces 36 and 38 are made elliptical in cross-section providing them with double-knife-like side edges. They are relatively thick at the center in cross-section, as for example 0.002 to 0.004 inch. They are preferably prepared by etching them to this form and desirably a roughened surface results from the etching. This roughened surface increases the adhesive forces between the quartz and molybdenum while the knife-like edges assist in balancing the relatively large difference in the thermal expansion coefficient of quartz and molybdenum.

The lower ends of the sealing-in leads 36 and 38 are attached in any suitable manner to the still thicker lead-in connectors 40 and 42, which can be cut from a molybdenum sheet. With the parts in position as shown the quartz tube 10 is heated to a fusing temperature and subjected to pressure from opposite sides by means of pressing jaws $C^1$ and $C^2$, which collapse the tube to the intermediate rectangular cross-section, as indicated at 18. The jaws apply their force at right angles to the plane of the leads 32, 36 and 40 and 34, 38 and 42 to form a gastight press, as is quite clear from Fig. 3. The faces of the clamping jaws have a pair of parallel grooves which serve to mold the transverse ribs 22 on opposite faces of the press 18.

With reference to the above description it is noted that in producing vacuum tight pressed seals in quartz glass, molybdenum ribbon providing circuit conductors has been used. However, the thickness of these ribbons has always been limited to a maximum of 0.0008 inch at the center of the cross-section and their width has been limited to 3/16 inch. This sets an upper limit for the current carrying capacity of 10 amperes per single ribbon lead. The high current pressed seal disclosed herein being elliptical in cross-section, permits of thicknesses of the range mentioned above. With the thicknesses and using molybdenum strip 3/8 inch in width, the current carrying capacity of a single lead is 50 amperes. It follows, therefore, that the double lead pressed stem illustrated above has a current carrying capacity of 100 amperes with a long lamp life of the order of several thousand hours.

At 76 is diagrammatically illustrated the tubulation tube for the lamp.

Figure 2:
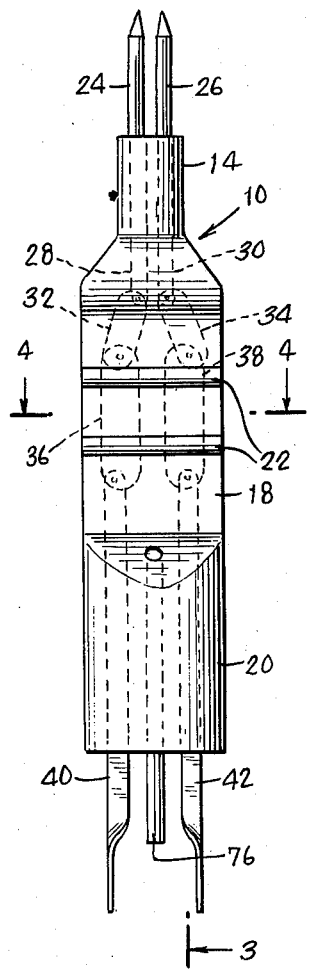
Figure 2 is an elevational view of the structure of Fig. 1 upon completion of said step.
Figure 3:
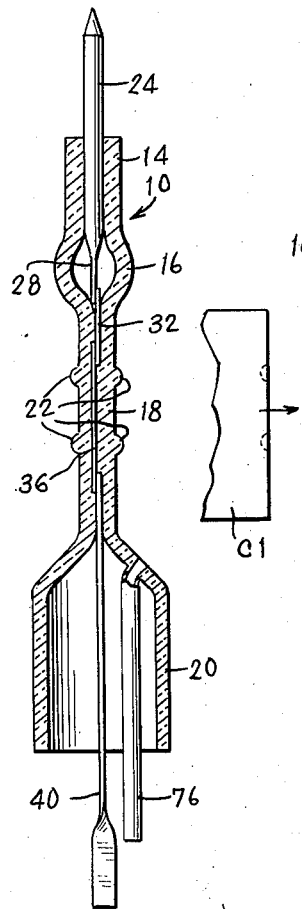
Figure 3 is a cross-sectional view taken on the line 3—3 of the structure of Fig. 2.

The complete lamp includes a pair of components like that of Figs. 2 and 3, with the exception that the other component indicated generally at 12 in Figs. 5 and 6, is slighty modified. In this case the heavier tungsten electrode 52 which serves both of the electrodes 24 and 26 is mounted in a boss 12ª, formed on the end of the quartz tube 12ᵇ. Its inner end is flattened, as indicated at 54, and has secured thereto by welding or otherwise, a molybdenum U-shaped connector 56, the arms of which are respectively connected to molybdenum ribbon leads 58 and 60 like the leads 36 and 38 of Fig. 2. At their other end the ribbon leads 58 and 60 are connected to a U-shaped lead 62, which in turn is connected to a circuit lead 64, all of which are preferably cut from molybdenum ribbon. In this case the component is pressed and fused about the current leads 58 and 60 to form a vacuum seal by means of clamping jaws, as in the previous case, to provide the flat rectangular seal with pairs of transverse ribs as before.

As illustrated in Figs. 5 and 6, there is claimped above each component the metal collars 44 and 66 which are preferably positioned by resting between the ribs 22. The collar 44 has pairs of lugs 43 on opposite sides and the collar 66 has similar lugs 68. Welded to these lugs on each side of each component are pairs of rods. In the case of the component 10 the rods are shown at 45 and 46 and in the case of the component 12 they are shown at 70 and 72. As shown in Fig. 6, the ends of each rod are forked to provide extensions which can be welded to oppositely positioned pairs of lugs 43 and 68, as illustrated.

The two components with their supporting rods are then longitudinally aligned by interconnecting the oppositely arranged ends of the rods 45, 46, 70 and 72 in sleeves 49 and 50. These sleeves can be short lengths of metal tubing into which the ends of the rods fit tightly. This permits of the relative longitudinal spacing of a pair of these components to provide accurate final adjustment of the electrode alignment and spacing. As illustrated, the internal auxiliary mirror 47 is provided with a pair of lugs 48 having sleeves at their ends so that the mirror can be slid onto the rods 45 and 46 and adjusted longitudinally thereof to be accurately positioned with respect to the arc gap at the electrodes.

This sub-assembly illustrated in Figs. 5 and 6 is then easily incorporated into the final assembly by telescoping it with a complementarily shaped quartz envelope 74. Each end of the envelope is necked down, as in the case of the lower end of Fig. 7, at 75. Each necked down end forms a close fit with the terminal cylindrical ends of the components 10 and 12 as illustrated. Thus, the cylindrical end 20 of the component 10 has external surface contact with the internal surface of the necked down portion 75 of the envelope. These parts are then fused together in accordance with well known practice, forming a structural unitary final product. The envelope 74 is expanded in the arc area. It will be seen that the precisely adjusted position of the parts is permanently finalized when the components 10 and 12 are sealed into the envelope.

It is also worthy of note that the sliding connection between the supporting rods and the sleeves 49 and 50 permits a slight realignment of the parts due to any thermal imbalance that might result due to expansion and contraction of the parts under manufacturing and operating conditions. The space between the seals can be evacuated through the tubulation tube 76, in accordance with well known practice, and then sealed off after the rare gas has been introduced.

Figs. 7 and 8 illustrate a slight modification in that for the lower part of the lamp the collar 44ª is provided with lugs 43ª and the ends of the rods 45 and 46 are shortened and provided with locking nuts as an alternative to welding the rods to the lugs as in the case of the upper collar 66.

Another form of lamp in accordance with this invention is illustrated in Figs. 9, 10 and 11, and differs from the previous form in that the current leads all come out of one end of the envelope instead of both ends.

In this case the sub-assembly, comprising the component 80, is modified so that all of the current leads pass through it. It is made of fused quartz and has the cross-section illustrated in Figs. 10 and 11. In this case the quartz tube 100 is pressed at the proper temperature into this form and is provided with four longitudinal passages in which the tungsten and molybdenum electrodes 82 and 84 are mounted in an opposite pair of wings and the lead wires and supporting rods 88 and 86 are mounted in the remaining pair. The inner ends of the electrodes and ribs are flattened and are attached to lead-in and sealing strips similar to the strips 36 and 38 of the previous construction. Strips 108 and 110 are connected to the electrodes 82 and 84 and strips 112 and 114 are connected to the wires 88 and 86 respectively. The external lead strips are shown at 116, 118 and 120 respectively, connected to the sealing strips 108, 110 and 112. The corresponding strip of the lead-in for the sealing strip 114 does not appear in the drawings as it is in back of the strip 120. The quartz tube 100 is fused and formed around these elements under heat and pressure to form a seal at the elliptical cross-section lead strips 108, 110, 112 and 114 in a manner similar to that previously described.

The upper ends of the wires 86 and 88 are reversely bent and have mounted thereon the tungsten electrode 102 and a support wire 104 for a U-shaped spring 106.

This sub-assembly is mounted within a quartz lamp housing 122 which is necked down at 124 to form a sliding fit with the lower end of the quartz tube 100. A vacuum tight seal results from the fusing of the parts 100 and 124 together. A tubular passage 90 extends through the stem and is provided with a tubulation tube which does not appear in the drawings but is in accordance with usual practice by means of which the space within the lamp can be evacuated and the proper rare gas introduced. As will be apparent, spring 106 can have various forms and is dimensioned to engage the inner wall of the envelope 122 to reduce vibration of the structure which supports single electrode 102. As in the previous case, a mirror could be properly positioned on the rods 86 and 88, if desired.

In addition to the other advantages of the structure and method described above, it is to be particularly noted that the components 10 and 12 are dimensioned so as to have a close sliding fit with the necked down ends of the envelopes 74 and 122, as for example the end 75 in Fig. 7. Thus the adjusted sub-assembly of parts can be sealed into the envelope and the seal made at a glass lamp with suitable heat to effect a fusion of the components to the envelope. This is accomplished with very little deformation of the envelope ends, so that the sealing process can be formed by unskilled personnel or on completely automatic sealing machinery without disturbing the fine adjustment between the electrodes and the mirror when a mirror is used.

It will be understood, of course, that the finished lamp will have bases in accordance with the usual practice in the art, a base at each end in the case of the structure of Fig. 7 and a base at one end only in the case of the structure of Fig. 9.

Reference is made above to the fact that the components 10 and 12 and the envelopes 74 to 122 are of quartz glass, but it will be understood by those skilled in the art that any other vitreous material suitable for lamps of this kind is contemplated as within the invention and intended to be covered by the claims which define these elements as being of quartz glass.

What is claimed is:

1. In a rear gas short arc lamp, a pair of arc-gap forming electrodes each having sectionalized current lead-in connectors, a support of vitreous material for said electrodes and connectors having a vacuum tight sealing press surrounding a section of each connector, a quartz glass envelope containing a rare gas enclosing said electrodes and support, and a vacuum tight seal between said envelope and support.

2. In the combination of claim 1, said enclosed connector sections being elliptical in cross-section with double-knife-like edges.

3. In the combination of claim 1, said sealed in connector sections being etched.

4. In the combination of claim 1, said enclosed connector sections having etched surfaces and being elliptical in cross-section with double-knife-like edges.

5. In the combination of claim 1, said support having a tubulation tube.

6. In the combination of claim 1, one of said electrodes being mounted in said support and the other mounted on support wires mounted on said support.

7. In the combination of claim 1, one of said electrodes being mounted in said support and the other mounted on support wires mounted on said support and a damping member mounted on said wires and engaging said envelope.

8. In the combination of claim 1, said current leads projecting from one end only of said envelope.

9. In the combination of claim 1, a focussing mirror mounted on said support opposite said arc gap.

10. In the combination of claim 1, said support and envelope comprising telescoped tubes having surface to surface contact.

11. In a rear gas short arc lamp a pair of arc-gap forming electrodes each having sectionalized current lead-in connectors, a pair of supports of vitreous material for said electrodes lying in spaced relation on a common axis to which said connectors extend, vacuum tight sealing presses formed in said supports and surrounding a section of each connector, aligned sets of positioning rods mounted on said supports respectively and axially aligned, means for adjustably connecting the adjacent ends of said rods, a quartz glass envelope containing a rare gas enclosing said electrodes and supports, and vacuum tight seals between said supports and the ends of said envelope.

12. In the combination of claim 11, a mirror adjustably supported on said rods.

13. In the combination of claim 11, said adjustable connecting means comprising tight fitting sleeves into which the adjacent ends of said rods are adjustably engaging.

14. A rare gas short arc lamp assembly comprising a pair of tubular components of vitreous material, electrodes mounted on said components respectively, sectionalized current lead connectors extending from said electrodes and through said components respectively, vacuum tight presses formed in said components and engaging a section of each of said connectors, collars mounted on said presses, and support rods secured to said collars and extending substantially parallel to said electrodes.

15. In the combination of claim 14, said rods having sleeves for permitting precise adjustment of the gap between said electrodes.

16. In the combination of claim 14, a focussing mirror mounted on said rods.

17. In the combination of claim 14, said support rods having connected thereto tight fitting sleeves for permitting precise adjustment of the gap between said electrodes and a focussing mirror mounted on said rods.

18. In the combination of claim 14, means for securing the ends of said support rods to align said components.

References Cited in the file of this patent

UNITED STATES PATENTS

| | | |
|---|---|---|
| 2,622,222 | Hegeman et al. | Dec. 16, 1952 |
| 2,664,517 | Wiener | Dec. 29, 1953 |
| 2,675,496 | Unglert et al. | Apr. 13, 1954 |
| 2,682,009 | Fraser | June 22, 1954 |
| 2,784,347 | Thouret | Mar. 5, 1957 |
| 2,843,801 | Krefft | July 15, 1958 |
| 2,876,377 | Retzer et al. | Mar. 3, 1959 |

FOREIGN PATENTS

| | | |
|---|---|---|
| 854,686 | Germany | Nov. 6, 1952 |